United States Patent [19]

Mario

[11] Patent Number: 6,103,384
[45] Date of Patent: Aug. 15, 2000

[54] PROCESS FOR THE SUPERFICIAL DECORATION OF OBJECTS MADE OF TRANSPARENT VITREOUS MATERIAL

[76] Inventor: Spinelli Mario, Via V. Niccoli 128 Loc. Cambiano, 50051 Castelfiorentino-Florence, Italy

[21] Appl. No.: 09/250,723

[22] Filed: Feb. 16, 1999

[30] Foreign Application Priority Data

Jul. 1, 1998 [IT] Italy .................................. FI98A0156

[51] Int. Cl.⁷ ............................. B32B 17/06; C23C 16/06
[52] U.S. Cl. ......................... 428/433; 428/432; 427/250; 427/255.11; 427/294; 427/419.1
[58] Field of Search ............................. 427/250, 255.11, 427/269, 294, 585, 419.1, 166; 428/433, 432; 65/446

[56] References Cited

U.S. PATENT DOCUMENTS 2,582,786   1/1952   Malloy .
3,937,854   2/1976   Shank, Jr. .
4,315,970   2/1982   McGee .
4,537,798   8/1985   Cohen .

FOREIGN PATENT DOCUMENTS 945 473       7/1956    Germany .
2028 952     12/1971    Germany .
209 176       4/1984    Germany .
40 35 062     5/1992    Germany .
196 04 741    7/1997    Germany .
508205        6/1939    United Kingdom .
709875        6/1954    United Kingdom .
1012706       1/1966    United Kingdom .
1125709       8/1968    United Kingdom .

*Primary Examiner*—Fred J. Parker
*Attorney, Agent, or Firm*—McGlew and Tuttle, P.C.

[57] ABSTRACT

The surface to be decorated, which will be visible through the vitreous material, is treated with a primer 7 which may be colored; the object is then placed in a bell in which a high vacuum can be produced, and there undergoes metallization 9; and the metallized surface of the object is then covered with a barrier.

19 Claims, 1 Drawing Sheet

PROCESS FOR THE SUPERFICIAL DECORATION OF OBJECTS MADE OF TRANSPARENT VITREOUS MATERIAL

FIELD AND BACKGROUND OF THE INVENTION

It is already prior art to decorate glass objects by a firing process, usually for decorating in gold, which is a particularly expensive and difficult process. The substantial cost is in the use of real gold for gilding, which represents a cost even when the weight of gold is very small, owing to the limitation of the area gilded and its extreme thinness. Even the firing process itself is costly, and there is absolutely no way of recovering any rejects, which therefore represent a further clear cost. The objects have to be handled many times because, after production of the glass objects, there must be application of the decoration, then handling to reintroduce the decorated objects into a kiln, avoiding contact and possible consequent irregularities in the decoration, then a second firing to stabilize the decoration, and finally removal of the objects from the kiln and inspection thereof and discarding of any rejects. The rejects may be numerous and are, as stated, irrecoverable.

Other processes offer different difficulties and problems, including problems with wear resistance.

SUMMARY AND OBJECTS OF THE INVENTION

It is an object of the present invention to eliminate the abovementioned problems and offer a process that offers both a saving of decorative material and labor, and the possibility of recovering rejects and reusing them by very simplified processes. These and other objects and advantages will be clear upon reading the following text.

For the purposes of the above objects the present invention provides a process for the superficial decoration of objects made of transparent vitreous material, according to which:

- the surface to be decorated, which will be visible through the vitreous material, is treated with a primer;
- the object is dried;
- the object or a collection of objects together is placed in an environment capable of achieving a high vacuum and there subjected to metallization;
- and the metallized surface of the object is coated with a barrier, which is dried.

In a possible development, a colored, e.g. gold-colored, aniline primer is used rather than a colorless primer, while the metallization is done with aluminum, to produce rear silvering.

Alternatively a transparent primer, especially a water-based primer, may be used, and the metallization is effected with aluminum to produce a frontal silvering visible through the vitreous material.

In either case the rear of the object may be spray coated with a transparent barrier, and treated in a drier at a temperature of about 60° C. for a few minutes.

The object, closed in the evacuated environment, is struck by an approximately 5000-volt ion discharge in order to remove all surface impurities and thus bring about perfect adhesion of the aluminum.

The invention also relates to an object decorated by the process defined above.

BRIEF DESCRIPTION OF THE DRAWINGS

A clearer understanding of the invention will be gained from the description and the accompanying drawing, which latter shows a practical, non-restrictive example of an embodiment of said invention. In the drawing.

DESCRIPTION OF THE PREFERRED EMBODIMENT

Figure 1:
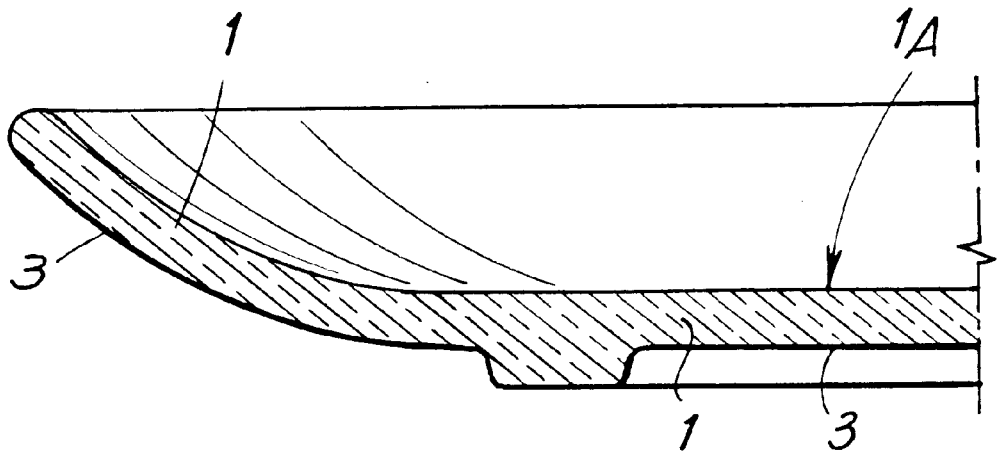
FIG. 1 is a diagram of a portion of an object decorated according to the invention.

In the drawing the numeral 1 denotes the object viewed through its thickness, the surface 1A of said object being that which offers—in use—the greatest visibility of the finished object. The opposite surface 1B is that which takes a decoration which in FIG. 1 is denoted by the general reference 3; this decoration will be visible through the thickness of the object 1 and through its surface 1A, which will be considered its "front" surface: this is the surface of the transparent vitreous material which constitutes the object and which may be transparent and neutral or transparent and more or less colored in order to contribute to the decoration.

After production of the object from glass or the like, the object is washed so that its surfaces are completely clean; this washing may be of the type known as washing with "trichloroethylene vapors". After this first operation a primer for the decoration is sprayed onto the surface to be decorated, labeled 3 (which will be taken to be the "rear" surface). The primer may be a primer used exclusively for the preparation of silvering, in which case the said primer is water-based and therefore will not interfere with the transparency of the glass to which it is applied. If the coloration is to be different from that of silvering, the primer may be an aniline primer with the addition of a coloring substance of any type and color and in particular also a coloring substance that allows, if desired, a gold coloration, this being a particular case, though preferable. The object sprayed with the primer of one or the other of the types indicated above undergoes drying, for example by being placed in a normal drier and subjected inside it to a temperature which will be of the order of 120° C.

The object thus treated and dried, on its own or together with a plurality of other similar objects similarly treated, is placed in and closed inside a high-vacuum bell or in some other environment capable of achieving a high vacuum, where it then undergoes treatment by deposition of particles of aluminum obtained from bars of high-purity aluminum that are made to evaporate or sublimate and so deposited on the exposed surfaces of the objects which are the surfaces treated in a preliminary step with the primer as indicated above. The object need not be kept for very long in the evacuated bell and is then subjected for a few minutes to an ion discharge of approximately 5000 volts for the reasons indicated earlier.

The object or objects thus treated are removed from the vacuum unit and each object can be coated as required with a barrier which preferably is of a transparent color to allow rear visibility of the silver color produced by the deposited aluminum. The barrier is simply sprayed on and the object can be dried again in a drier at a lower temperature than that to which the object was subjected on the previous occasion; for example at a temperature of around 60° C. for a minute or so—long enough to dry the barrier. Whether transparent or not, the barrier will be tough enough for prolonged use of the object.

The result is an object that may have either a purely silver coloration, where the primer is water-based and transparent, or a coloration of gold or other tints depending on the type of aniline primer employed.

In either case the decorated object still has a surface that is usable and visible, i.e. the "front" surface, which is simply the vitreous material of which the object is made, thus having the absolute toughness offered by normal glass objects and being completely safe from the hygienic point of view.

The advantages of the system described above are obvious. In particular, products treated by the above process present an appreciably lower percentage of rejects than objects treated in the kiln or by other known means. Besides this, the objects decorated under vacuum are capable of being recovered and do not therefore occasion substantial wastage of product and energy costs. The products required for decoration, including and in particular gold coloration, are much cheaper than products gilded by firing.

Fired-on decorations also have the problem that, at the end of the treatment, they may contain severe internal stresses due to being heated for the decoration (approximately 530° C.) and the resulting objects may therefore break, sometimes without warning, creating a risk to persons in the vicinity at the moment of the breakage. Objects obtained with the process defined above and falling within the scope of the invention contain no internal stresses, owing to the low temperature to which in each case the objects decorated in the manner described above are subjected. The objects are therefore stronger and safer.

Their wear resistance is effectively sufficient for the normal uses of the objects obtained with the process described above, compared with the so-called "firing" processes known hitherto.

The problems and costs of the methods previously adopted for producing decorated glass objects are thus eliminated, while at the same time further advantages including cost and safety are achieved.

Figure 2:
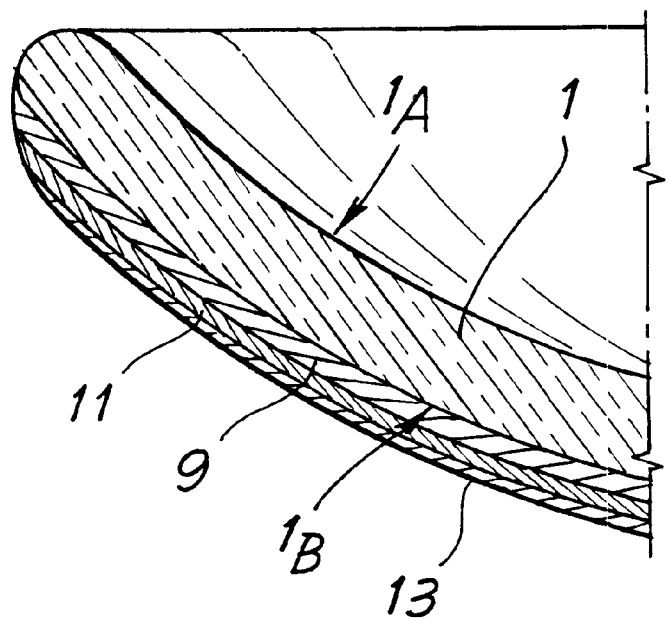
FIG. 2 shows a highly enlarged detail of the object shown in FIG. 1.

As can be seen in FIG. 2, which shows symbolically the structure of the decorated object, with enlargements for ease of observation, the object 1, which is transparent through its thickness, comprises on the "rear" side 1B: the layer of primer indicated at 9, which may produce the aniline decoration; the layer of silvering decoration indicated at 11; and—if required—a protective outer layer indicated at 13. The decoration (or metallization) is visible from the surface 1A—opposite the treated surface 1B—through the thickness 1 of the glass.

The layer 13 is transparent so that the silvering is visible.

It will be understood that the drawing shows only an example provided purely by way of a practical demonstration of the invention, it being possible to vary the shapes and arrangements of the invention without thereby departing from the scope of the concept on which the invention is based.

What is claimed is:

1. A process for superficial decoration of objects, comprising the steps of:
   providing an object made of transparent vitreous material with a surface to be decorated which will be visible through the vitreous material;
   treating the surface to be decorated with an aniline primer to provide a treated object;
   drying the treated object to provide a dried treated object;
   placing the dried treated object in an environment capable of achieving a vacuum required to carry out metallization and subjecting the dried treated object to metallization in the environment to deposit metal particles on the dried treated object.

2. The process according to claim 1, wherein the aniline primer is a colored aniline primer.

3. The process according to claim 2, wherein the aniline primer is gold-colored.

4. The process according to claim 1, wherein said metallization is done with aluminum to produce silvering on a rear surface of the object.

5. The process according to claim 2, wherein said metallization is done with aluminum to produce silvering on a rear surface of the object.

6. The process according to claim 3, wherein said metallization is done with aluminum to produce silvering on a rear surface of the object.

7. The process according to claim 1, wherein the object is closed in the environment, the environment is evacuated and the object is struck with an approximately 5,000-volt ion discharge.

8. The process according to claim 2, wherein the object is closed in the environment, the environment is evacuated and the object is struck with an approximately 5000-volt ion discharge.

9. The process according to claim 3, wherein the object is closed in the environment, the environment is evacuated and the object is struck with an approximately 5000-volt ion discharge.

10. The process according to claim 4, wherein the object is closed in the environment, the environment is evacuated and the object is struck with an approximately 5000-volt ion discharge.

11. The process according to claim 10, wherein said step of metallization provides the object with a metallized surface and said process further comprising: coating said metallized surface of the object with a barrier; and drying said barrier.

12. The process according to claim 2, wherein said step of metallization provides the object with a metallized surface and said process further comprising: coating said metallized surface of the object with a barrier; and drying said barrier.

13. The process according to claim 3, wherein said step of metallization provides the object with a metallized surface and said process further comprising: coating said metallized surface of the object with a barrier; and drying said barrier.

14. The process according to claim 11, wherein said step of coating with a barrier includes spray coating the metallized surface of the object with a transparent barrier and said step of drying said barrier includes treating the metallized and coated surface of the object in a drier at a temperature of about 60° C. for a minute or long enough to dry said barrier.

15. A decorated glass object, comprising:
   a transparent vitreous material substrate;
   a layer of aniline primer on a surface of said substrate;
   a metallization layer on said primer.

16. The decorated object according to claim 15, wherein said aniline primer is colored.

17. The decorated object according to claim 16, wherein said aniline primer is gold-colored.

18. The decorated object according to claim 15, wherein said metallization layer is an aluminum layer.

19. The decorated object according to claim 16, wherein said metallization layer is an aluminum layer.

* * * * *